April 6, 1965    C. E. MEESE ETAL    3,176,726
HOSE CLAMP DIE AND METHOD OF MAKING SAME
Filed Oct. 4, 1963    3 Sheets-Sheet 1
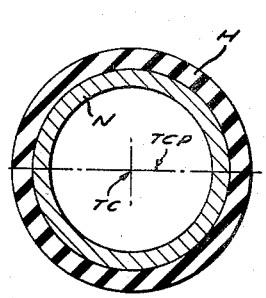
Fig. 1
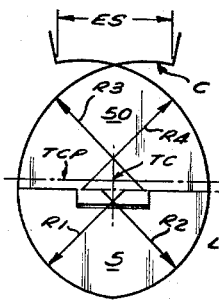
Fig. 2
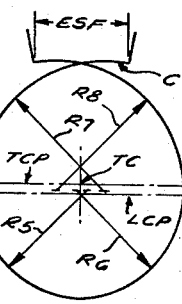
Fig. 3
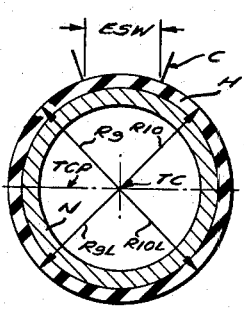
Fig. 4
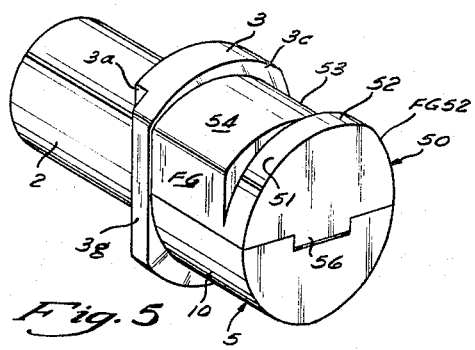
Fig. 5
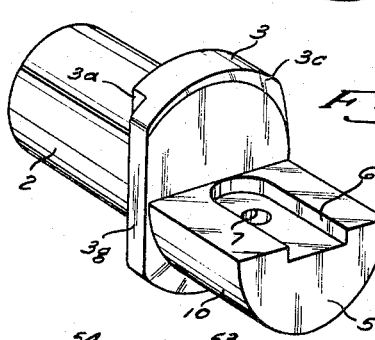
Fig. 6
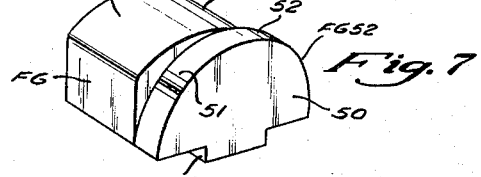
Fig. 7
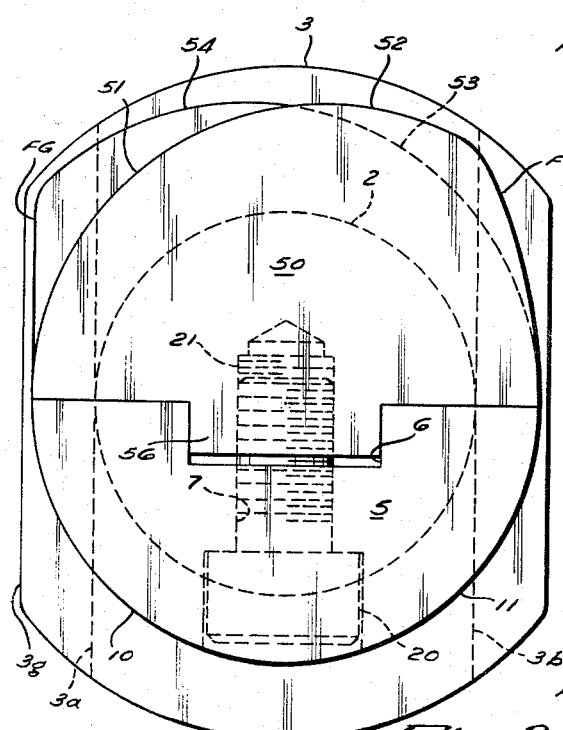
Fig. 8
Fig. 9
INVENTORS
CLARENCE E. MEESE,
& RONALD R. MEESE
BY
RICHEY, McNENNY & FARRINGTON
ATTORNEYS April 6, 1965    C. E. MEESE ETAL    3,176,726
HOSE CLAMP DIE AND METHOD OF MAKING SAME
Filed Oct. 4, 1963    3 Sheets-Sheet 2
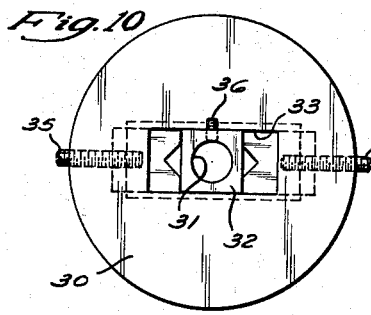
Fig. 10
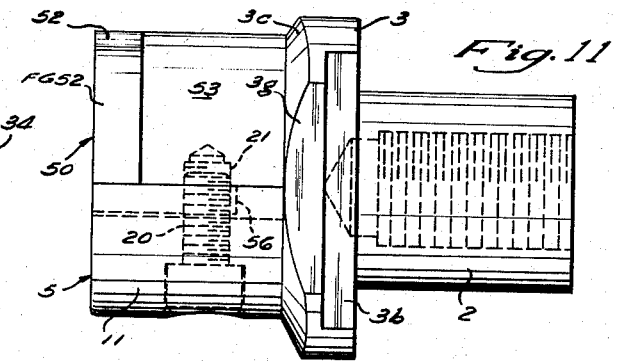
Fig. 11
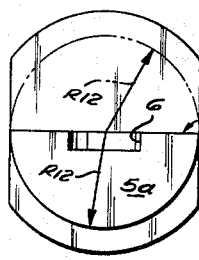
Fig. 12
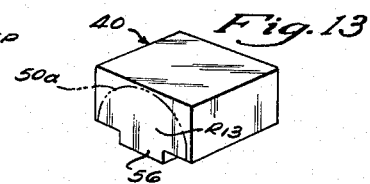
Fig. 13
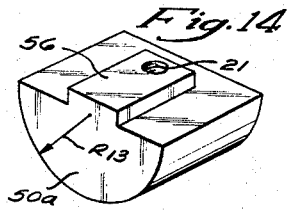
Fig. 14
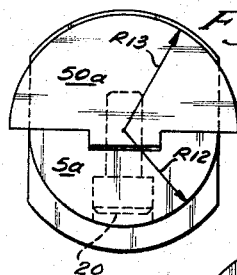
Fig. 15
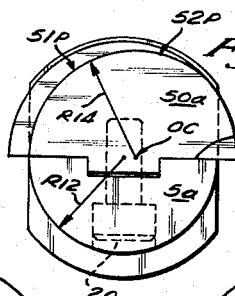
Fig. 16
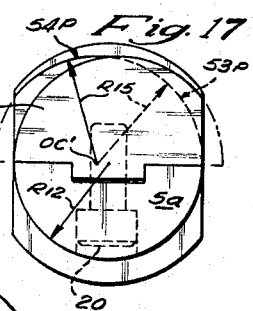
Fig. 17
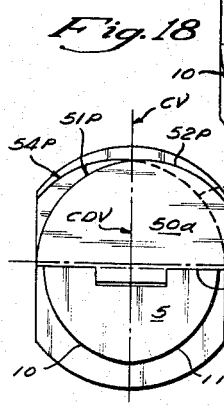
Fig. 18
Fig. 20
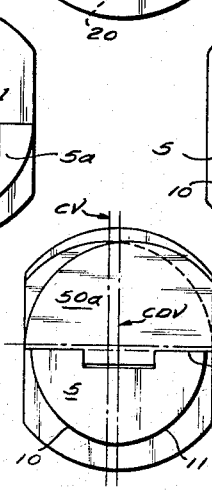
Fig. 19
Fig. 21
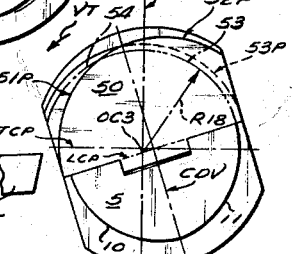
Fig. 22
INVENTORS
CLARENCE E. MEESE,
& RONALD R. MEESE
BY
RICHEY, McNENNY & FARRINGTON
Ronald W. Farrington
ATTORNEYS April 6, 1965

C. E. MEESE ETAL 3,176,726

HOSE CLAMP DIE AND METHOD OF MAKING SAME

Filed Oct. 4, 1963

INVENTORS
CLARENCE E. MEESE,
& RONALD R. MEESE
BY
RICHEY, McNENNY & FARRINGTON

Ronald W. Farrington

ATTORNEYS

United States Patent Office 3,176,726
Patented Apr. 6, 1965

3,176,726
HOSE CLAMP DIE AND METHOD OF MAKING SAME
Clarence E. Meese, New Philadelphia, and Ronald R. Meese, Newark, Ohio, assignors of twelve and one-half percent each to Naomi M. Streb and Joseph M. Streb, Dover, Ohio
Filed Oct. 4, 1963, Ser. No. 314,030
9 Claims. (Cl. 140—80)

Our invention relates to hose clamps and more particularly to the apparatus for making the hose clamp of the type described and claimed in our U.S. Letters Patent No. 3,008,206 which issued November 14, 1961, and in our co-pending application "Method and Apparatus for Hose Clamp," Serial No. 151,965, filed November 13, 1961 (Docket No. 6635) 3,113,597, granted December 10, 1963 of which the instant application is a continuation-in-part.

Numerous attempts were made to improve the spring type hose clamp prior to our said issued Patent No. 3,008,206, and such prior art efforts included the patent to Golden, No. 2,685,719 and the patent to Arras, No. 2,793,414. The hose clamps of said Golden patent and said Arras patent were characterized by being formed on core dies which were semi-cylindrical in their lower body portions. The prior art inventors, such as Golden and Arras, failed to remedy the defects that were attendant upon shaping the lower body portion of the clamp around a circular arc. When the wire forming the hose clamp is shaped in the lower portion of the clamp around a semi-circular arc, the spring-back characteristics of the wire, after it is released from the forming tools, causes the opposite side portions of the clamp to move away from each other. Since the two sectors which form the upper portion of the clamp cross over at their free ends, there is little resistance to carrying the two upper sectors away from each other in response to the outward motion of the wire at the side areas caused by the spring-back. Such outward motion is aggravated by the normal spring-back in the upper body portion of the clamp.

Completed hose clamps, that is, hose clamps after heat treating and plating, are frequently tested by submerging the clamps in an acid solution. When hose clamps are made according to the teachings of the prior art (such as the Golden and Arras patents), such clamps break at the hinge point or mid-point of the length of wire forming the clamp. All of the reasons for the concentration of internal stress and breakage at the hinge point are not understood. It appears that incipient transverse cracks are produced by the concentrated stressing and flexing of the hose clamp at the hinge point. Hose clamps formed on dies shaped according to our invention do not break in said acid test at the hinge point at the lower end of the vertical axis but, on the contrary, when broken in the acid test the breakage occurs at one side or the other (or both sides) near the ends of the minor axis. Furthermore, hose clamps made according to our invention greatly out-perform the prior art hose clamps under such acid tests. For example, under comparative tests in an acid solution of a given concentration, our hose clamps more than double the acid test life of the prior art hose clamps. Based on tests on clamps made according to our invention, it appears that the flexing and stressing of the clamp is evenly distributed through areas at each side of the clamp.

It is among the objects of our invention to provide an elliptical hose clamp die of the type disclosed in said Patent No. 3,008,206 and a method of making such an elliptical die in two parts whereby the accurate shaping of the die is facilitated and the die itself is characterized by long die life and by simple adjustments which result in important dimensional changes in the hose clamps formed on the die.

It is a further object of our invention to provide a two-part die for forming hose clamps having upper and lower separable portions wherein the elliptical surface of the die about which the wire forming the clamp is wrapped is characterized by four circular arcs, and wherein the said upper portion of the die and the said lower portion of the die have their circular arc portions merged into each other at the minor axis separating the upper and lower portions.

It is an object of our invention to provide an elliptical core die for making hose clamps wherein the upper and lower portions of the die are generally semi-elliptical and are secured to each other at a generally horizontal plane normal to the major axis of the elliptical form.

It is a further object of our invention to provide a die and method of making same according to the preceding object wherein the upper and lower semi-elliptical portions are joined to each other along a plane including the centers of the radii which provide the elliptical form.

It is among the objects of our invention to provide a two-part core die for making hose clamps wherein the upper and lower portions of the die may be quickly and easily separated from each other and thereafter re-assembled with shims inserted between the upper and lower portions of the die whereby wear of the core die may be compensated for and the useful life of the die correspondingly increased.

It is a further object of our invention to provide a two-part core die wherein one part consists of a shank, a key flange and a semi-elliptical core die section and the other part consists of a generally semi-elliptical core die section having arm-forming surfaces, and wherein the upper and lower core die sections are secured to each other.

It is a further object of our invention to provide a core die according to the preceding object whereby grinding the opposing faces where the semi-elliptical portions are joined makes acceptable clamps of wire having increasing spring-back characteristics.

It is a further object of our invention to provide a method of making a core die according to the two preceding objects wherein the first-named core die section is first shaped as a semi-cylindrical section, and wherein the other core die section is also first shaped to provide a semi-cylindrical section, and wherein the two semi-cylindrical sections are then secured to each other during a second shaping step of the said other core die section and thereafter the die sections are separated from each other and the said first core die section is provided with a semi-elliptical shape, and wherein the two core die sections are again secured to each other while said other core die section is contoured to its final shape.

It is a further object of our invention to provide a die and method of making same according to the preceding objects wherein the upper semi-elliptical sections of the die are characterized by having arm-forming portions at opposite sides of the major axis of the semi-elliptical form and wherein the arm-forming portions are offset from each other axially and wherein the arm-forming portions extend above a horizontal plane tangent to the elliptical form at the major axis of the ellipse whereby the arm of the clamp formed thereon presents a small included angle between the arm and said plane.

Further objects and advantages relating to long tool life, economy of die manufacturing and tool maintenance and flexibility in use in accurately forming clamps of different dimensions will appear from the following description and the appended drawings wherein:

FIG. 1 is an elevation in section showing a hose and nipple oriented with respect to a vertical axis and a horizontal true center plane;

FIG. 2 is a diagrammatic elevation of the two-piece core die of the instant invention and a hose clamp wrapped about such core die;

FIG. 3 is a diagrammatic elevation of the hose clamp in its free state after removal from the core die of FIG. 2;

FIG. 4 is a sectional elevation of the hose and nipple with the hose clamp applied thereto so as to compress the material of the hose against the nipple;

FIG. 5 is a perspective view of the completed core die made according to our invention;

FIG. 6 is a perspective view of one part of the core die consisting of the mounting shank, a key flange and lower core die section;

FIG. 7 is a perspective view of the upper core die section which is adapted to be mounted on the unit shown in FIG. 6;

FIG. 8 is a perspective view of the completed core die showing the spiral hose clamp as wrapped around the core die at the conclusion of the clamp-forming cycle;

FIG. 9 is an enlarged elevation (with parts in dotted line) of the completed core die made according to our invention;

FIG. 10 is an elevation of a work-piece holding jig useful in the making of the core die of the instant invention;

FIG. 11 is a side elevation of the completed core die assembly;

FIG. 12 is an end elevation illustrating the lower section of the core die after a preliminary forming operation is completed;

FIG. 13 is a perspective view showing a generally rectangular work-piece or blank used for making the upper core die section;

FIG. 14 is a perspective view of the upper core die section inverted to show the mounting key;

FIG. 15 is an end elevation showing the upper core die section at one stage of its manufacture as assembled on the lower core die section during the making of the core die;

FIG. 16 is an end elevation illustrating the core die during a preliminary off-center machining operation;

FIG. 17 is a view similar to FIG. 16 showing the core die during another preliminary off-center machining operation;

FIG. 18 is an end elevation of the lower core die section showing a final off-center machining operation on one side of the lower core die section;

FIG. 19 is a view similar to FIG. 18 showing the lower core die section after a final off-center machining operation at the other side of the lower core die section;

FIG. 20 is an end elevation showing the core die assembly of upper and lower sections prior to a final off-center machining operation on the upper core die section;

FIG. 21 is a view similar to FIG. 20 except that the assembly is offset in the jig to facilitate the final machining operation on the upper core die section;

FIG. 22 is a view similar to FIG. 21 illustrating the tilted position of the core die assembly in the jig for a final off-center machining operation on the upper core die section;

Figure 23:
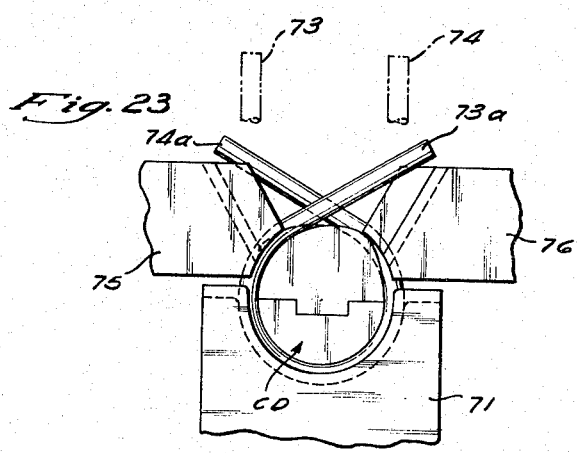
FIG. 23 is an elevation with parts broken away showing the formation of a hose clamp by the use of a four-slide machine equipped with a core die made according to our invention.
Figure 25:
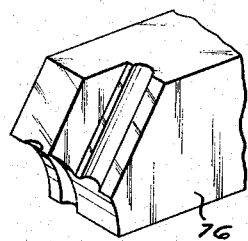
FIG. 25 is a perspective view of one of the side tools shown in FIGS. 23 and 24.

Certain gaging standards have been adopted by the automotive and other industries using the spring wire type of hose clamp, and we have found that hose clamps formed according to the present invention meet such gaging specifications and yet provide a smaller inner periphery when in operation than the inner periphery obtainable with core dies made according to the prior art. We have found that other advantages are obtained by the use of our core die invention such as, for example, the use of less expensive wire stock. Ordinarily, the cost of the wire stock increases as the seam or fold number decreases. As will be understood by those skilled in the art, high quality (low seam number) wire is characterized by very few voids or folds or seams. The seam number generally refers to the depth of seams that are found in the surface of the wire stock. With the prior art core die apparatus it was found that it was necessary to use wire stock having a low seam number since the clamp itself was heat-treated to a high Rockwell and was severely stressed when applied to the hose. The higher the Rockwell, the more brittle the clamp and, accordingly, the greater likelihood of breakage due to seam and fold defects when the clamp is expanded to be placed on the hose. According to our invention, a low cost wire, having a high seam number, may be used and heat-treated to a lower Rockwell and is thus less liable to break when in use.

Referring to the drawings, FIGS. 1, 2, 3 and 4 are shown as oriented with respect to a true center plane indicated as TCP. The term "true center plane" is employed herein in its usual sense and is derived from the central axis or true center TC of the hose and nipple assembly.

In FIG. 2, which illustrates a core die and clamp embodying our invention, the lower part of the core die 5 is separated from the upper part of the core die 50 along the lathe center plane LCP. The hose clamp C is illustrated in FIG. 2 in its final forming step wherein the hose clamp is coined on the surfaces of the die and, in FIG. 3, the hose clamp C is illustrated in its free state which corresponds to its shape after it has been released from the forming machine and before the hose clamp has been applied to the hose.

The hose H and the nipple N are shown in FIG. 1 prior to the application of the hose clamp and, in FIG. 4, the hose H is reduced in thickness by reason of the pressure being applied to the hose by the clamp C. The space between the ears of the clamp is indicated at ES in FIG. 2, at ESF in FIG. 3 and at ESW in FIG. 4. Such space between the ears is greatest as the clamp is wrapped tightly about the core by the forming tools. The space between the ears is thereafter reduced by the spring-back in the clamp when the clamp is in its free state, as shown in FIG. 3. FIG. 4 illustrates the hose clamp in its working position which provides the minimum spacing between the ears, as indicated at ESW.

It will be observed that when the hose clamp is wrapped tightly on the core die, the radii for the arcs, as at R1, R2, R3 and R4, corresponds to the die radii having their centers on the lathe center plane which is below the true center plane. When the clamp C is released from the die, however, the clamp assumes its free state due to the spring-back in the wire and the centers for the radii R5, R6, R7 and R8 move above the lathe center plane and in a direction toward the true center TC. Thereafter, when the hose clamp is expanded and applied to the hose, the clamp assumes a substantially circular shape and the radii R9L, R10L, R9 and R10 have their centers coincident with the true center TC of the assembly shown in FIG. 4.

Accordingly, it will be observed that the hose clamp is characterized by a generally elliptical shape when formed on the core die of FIG. 2. In its free state the clamp is also characterized by a generally elliptical shape having slightly different curved sectors. In its working state (FIG. 4) the hose clamp C assumes a circular form exerting substantially uniform pressure throughout the periphery of the clamp to press the hose against the nipple.

It will be understood that the proportions and dimensioning are exaggerated in the showings of FIGS. 1 to 4 for the purposes of illustrating our structure and its mode of operation. For a size 20 clamp the centers for radii R1 and R2 are offset .008 and the centers for radii R3 and R4 are displaced .077.

Referring to FIG. 5, the completed core die includes a cylindrical shank 2, a key flange 3 and an upper core die part 50. The portions 2, 3 and 5 are integrally formed from one piece of bar stock and the portion 50 is formed from a separate work-piece and is mounted securely on portions 2, 3 and 5 when the core die is assembled for forming hose clamps. It is pointed out that the shank 2 and the key flange 3 are utilized for mounting the core die assembly in the clamp-forming machine and such portions are also utilized in machining the shapes of the surfaces on the core die.

The lower part of the core die 5, when completed, is provided with a keyway 6 and an opening 7 which receives a fastening device to lock the core parts 5 and 50 to each other. The upper core die part 50 is provided with working surfaces such as 51 and 52, 53 and 54.

The hose clamp C, which is characterized by the spiral shape shown in FIG. 8, is formed in its upper left-hand quadrant on the core die working surface 51 and in its lower left-hand quadrant on the core die working surface 10 of the lower core part 5. The hose clamp C spirals continuously from the left arm-forming working surface 52 on the upper core die 50, around the core die and thence to the surface 54 which shapes the left arm of the hose clamp. Accordingly, it will be noted that the left-hand side of the hose clamp is shaped in part by both the upper and lower sections 5 and 50 of the core die and that the right-hand side of the clamp is similarly formed about working surfaces on both parts of the core die. The arm-forming surfaces 52 and 54, however, are both provided in the upper section 50 of the core die. The arm portions of the hose clamp C, as used herein refer to the portions of the clamp which extend at each side of the cross-over or intersection of the top of the vertical axis of the clamp C. The arm portions are characterized by being disposed at a small included angle with respect to a horizontal plane normal to the vertical axis at the cross-over or intersection at the top of the clamp C.

The core die assembly, as illustrated in FIG. 9 is arranged with the integrally formed key 56 on the upper section 50 located in the keyway 6 formed in the lower die section 5. The parts are locked to each other by a cap screw 20 carried within a vertical hole or bore 7 in the lower core die section and extending into a threaded opening 21 in the upper die section 50. The upper and lower sections are clamped to each other and both sections are drilled at the same time so as to insure perfect alignment of the sections during the manufacture of the core die and also maintain such alignment when the core die is in use. The hole or bore 7 in the lower section is proportioned to accommodate and permit free turning of the cap screw 20. A tap size drill is first employed and the upper section is then threaded.

The two-part core die according to our invention may be conveniently manufactured on conventional machine tools such as a lathe and milling machine. A jig, such as the jig shown in FIG. 10, is useful in the making of the die according to our invention. In using the jig 30 the shank 2 of the work-piece is mounted in the cylindrical bore 31 of the jig. A laterally slidable block 31 is carried within a rectangular guideway 33 and the position of the block 32 in the guideway 33 is determined by adjustment of the screws 34 and 35. The lock screw 36 is caried by the block 32 and when the lock screw 36 is withdrawn from its locked position, the shank portion 2 of the work-piece is free and may be turned bodily on its own axis within the bore 31. It will be understood that the jig 30 in its entirety is adapted to be carried on its own stem or shank in the chuck of a lathe. The block 32 is shown in FIG. 10 as being in its central position and thus the axis of the shank 2 of the work-piece would be disposed on the turning axis of the lathe. By shifting the block 32 from side to side, the shank 2 of the work-piece may be offset with respect to the turning axis of the lathe.

The machining operations for making the two-part die of our invention preferably include the following steps in sequence:

*Step I.*—The work-piece, including the shank 2, is mounted in the lathe chuck and a cylindrical portion having radius R12 is formed. The axial extent of R12 corresponds generally to the axial extent of the lower section 5 of the core die indicated in FIG. 11. The upper half of such cylindrical piece is then milled away so as to leave the semi-cylindrical portion indicated at 5a in FIG. 12. The portion 5a is then provided with the keyway 6. The milling away of the upper cylindrical part of the work-piece provides the parting line indicated at the lathe center plane LCP.

*Step II.*—A rectangular block indicated at 40 in FIG. 13 is machined at its underside to provide the key 56. A tap size drill is used to form the opening which becomes the threaded opening 21. The key 56 is proportioned as shown in FIG. 14 to fit the keyway 6 and is provided with the threaded opening 21 so as to provide for mounting the block 40 in supported position on the lower die section 5a. With the parts thus assembled in the chuck of the lathe, the block 40 is machined to provide a semi-cylindrical part 50a shown in FIGS. 13 and 14. The semi-cylindrical part 50a is machined on a radius R13 which is sufficient to provide stock for subsequent machining including stock for the ear-forming surfaces 52p and 54p shown in FIGS. 16 and 17.

*Step III.*—Preliminary forming operations are now carried out on the upper part of the core die. The assembly shown in FIG. 15 is placed in the jig 30 and the jig block 32 is displaced laterally in the jig by means of screws 34 and 35 to the off-center positions shown in FIGS. 16 and 17. The displacement laterally corresponds to the difference between the radii R12 and R13 of FIG. 15. During the preliminary cut at the left-hand side of 50a, the work-piece turns on radius R14 about the offset center OC. This produces a surface indicated at 51p. Since the offset or center OC is the difference in length between radii 12 and 13 and both centers are in the lathe center plane LCP, the surface 51p blends with the semi-cylindrical die part 5a at the parting line between the die sections on the left-hand side.

*Step IV.*—The core die assembly is then shifted laterally in the jig 30 to the opposite side of the vertical plane through the lathe axis so as to machine a surface as at 54p and 53p about OC′ as a center indicated in FIG. 17. It will be understood that the radius R14 of FIG. 16 corresponds in length to the radius R15 in FIG. 17. It will also be understood that the surface formed about OC′ as a center is a preliminary surface indicated at 54p.

*Step V.*—The upper core die part 50a is then removed from the lower core die part 5a by removing the cap screw 20. The lower core die part 5a is now provided with an elliptical shape and thus converted to its finished form 5 as indicated in FIG. 19. The conversion of the semi-cylindrical shape 5a to the semi-elliptical shape 5 is accomplished by offsetting the work-piece in the jig so that the part 5a is machined at the left-hand side about the center indicated at OC1 in FIG. 18. The amount of this offset is determined from experience with the spring-back characteristics encountered in practice. It is also related to the diameter of the wire stock of which the clamp is formed. For instance, as a general proposition the larger the diameter of the wire stock, the greater the spring-back characteristics for the same nominal size clamp. This offset is also related to the size of the clamp and the standards and gauge specifications established for the various sizes in the industry. Generally speaking, the greater the amount of spring-back which is to be compensated for in the die, the greater the offset from the vertical axis for the center OC1 in FIG. 18. For example, in a size 20 clamp (nominal size 1¼ inches) of steel wire having a diameter of about .153 to .151, we have found an offset of .008 of an inch to be satisfactory. The greater the offset employed, the more pronounced the elliptical shape in the die. In the machining operations of FIGS. 18 and 19, no stock is machined away on the vertical axis and thus the radii R12 is maintained for the vertical height of the finished die part 5. The final working surface 10 is cut on radius R16 at the left-hand side of core die part 5 as shown in FIGS. 18 and 19. The final working surface 11 is formed by offsetting the work-piece the same amount to the opposite side of the vertical axis and cutting about the radius R17. The surface 11 is formed about the center indicated at OC2 in FIG. 19.

*Step VI.*—The lower portion of the core die having its final shape as indicated at 5 is then assembled with the upper core die part 50a. Core die part 50a has the preliminary surfaces formed as at 51p, 52p, 53p, and 54p. Such preliminary surfaces were formed about the centers OC and OC' and with radii R14 and R15. To provide such areas with their final dimension and shape and bring about a blending of the arcs at the parting line between upper and lower die parts, the operations illustrated in FIGS. 20, 21 and 22 are carried out. In FIG. 20 the assembly of 50a and 5 is illustrated as being centered in the jig 30 and the jig 30 being mounted in the chuck of the lathe. In this position the vertical axis CDV of the core die assembly is coincident with the vertical plane CV through the center of the chuck of the lathe.

For convenience the die maker may scribe the vertical axis CDV on the end face of the core die parts 5 and 50a.

*Step VII.*—The core die assembly is then shifted laterally in the jig 30 by means of the screws 34 and 35 to offset the core die vertical axis CDV to the right as indicated in FIG. 21 with respect to the chuck vertical plane indicated at CV. The amount of offset laterally corresponds to the difference in horizontal distance across the parting line LCP between the lower core die part 5 and the upper core die part 50a. In the final machining of the upper core die part 50a the arcs at the upper core die part merge and blend with the arcs in the lower core die part 5 at the parting plane indicated at LCP. This blending of the arcs is below the true center plane indicated at TCP.

*Step VIII.*—With the lateral offset determined and fixed by the screws 34 and 35 in the jig, the entire core assembly is tilted by rotating the assembly on its axis within the bore 31 of the jig block 32. Accordingly, the locking screw 36 is loosened and the core die axis indicated at CDV is tilted in the direction indicated by the arrow VT in FIG. 22. The tilting of the assembly is such that the surface 53 blends with the surface 11 at the parting line. Thereafter the locking screw 36 is tightened and the core die assembly held in the position shown in FIG. 22 while it is being turned in the lathe chuck around the center indicated at OC3. A cutting tool, indicated at CT, is moved against the rotating piece so as to machine to final dimension the surfaces 53 and 54. The result of the offsetting and tilting in the jig as here described is that although the surfaces 53 and 54 are being machined on the radius R18, no material will be machined from the lower core die part 5.

*Step IX.*—After the surface 53 has been blended with the arc of surface 11 in the lower right-hand quadrant of the core die, the core die assembly is returned to the position indicated in FIG. 20 in preparation for the final machining of the upper die surfaces 51 and 52. The operations of FIGS. 21 and 22 are thereupon reversed by shifting the assembly laterally so that the vertical axis CDV is disposed at the left-hand side of the vertical axis CV of the chuck. It will also be understood that the tilting of the axis CDV is effected in an opposite direction from the tilting VT indicated in FIG. 22. The tilting was counter-clockwise for the cutting surface 53 and was clockwise for cutting surfaces 51 and 52. The axial extent of the cuts is determined as heretofore described in connection with FIG. 8 and the axial space between the hose clamp C and the flange 3 is utilized for clearance of the forming tools shown in FIGS. 23 to 27, inclusive. In the final cut forming surfaces 51 and 52, the surface 51 blends with surface 10 at the parting line.

*Step X.*—The finishing operations involve machining the chamfer or slope 3c indicated at the juncture between the core die surface 53 and the key flange 3. A finishing milling operation is carried out at the left-hand side of the upper die portion 50 as indicated at FG. This space is also useful for tool clearance during the forming operations. A similar milling operation is carried out at the right-hand side of the upper die part 50 as indicated at FG52. Tool clearance flats are also milled on the vertical edges of the flange 3 as indicated at 3g. All sharp corners are chamfered to facilitate release of the formed clamps from the core die. It will be understood that the key shoulders 3a and 3b in the flange 3 are useful in mounting the core die tool in the four-slide forming machine as well as being used in orienting and holding the work-piece during the manufacture of the core die.

We are aware that a core die having the contours resulting from Steps I to X above may be manufactured in other ways. We are aware that such contours may be obtained by making the core die in one piece on a cam grinder. We are also aware that such one-piece core die machined on the cam grinder may be cut horizontally so as to provide two separate core die sections which may thereafter be keyed and locked together so as to obtain the many useful results of the two-part core die.

In connection with the preferred method of machining of the two parts of the core die, we have utilized the lower core die in a preliminary state as at 5a as a holder or support for the machining of the upper core die part 50a. We have also utilized the finally formed lower core die part 5 as a holder and support for the upper core die part when final machining of surfaces on part 50 is carried out as shown in FIGS. 21 and 22.

Figures 28, 29:
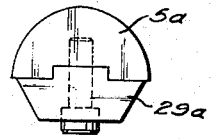
FIG. 28 is an elevation illustrating a modified method and apparatus for machining the part which forms the upper section of the core die.
FIG. 29 is a view similar to FIG. 28 showing apparatus for machining the part which forms the lower section of the core die.

We are aware that the upper core die part 50 may be machined from rectangular stock such as 40a by mounting such stock on a holding fixture 28a having a keyway 28b as illustrated in FIG. 28. Similarly the lower core die part 5a may be machined to its semi-elliptical or final contour in a holding fixture 29a shown in FIG. 29.

Figure 30:
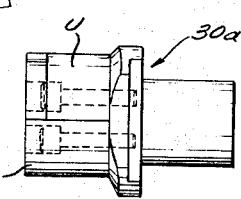
FIG. 30 is an elevation showing core die parts from the apparatus of FIG. 28 and FIG. 29 mounted on a die holder for a four-slide machine.

The die sections U and L of FIG. 30 which were separately made on the holding tools 28a and 29a may be securely mounted on a die holder 30a. The assembly of 30a, U and L may be used in a four-slide machine as in the preferred form.

The method Steps I to X are preferred in that it simplifies dimensioning for the tool and die maker and minimizes the danger of cumulative tolerances in the completed article.

Figure 27:
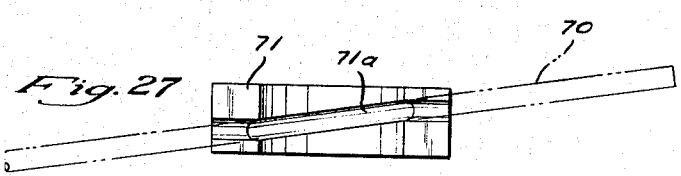
FIG. 27 is an end view of one of the slide tools illustrating the tool as engaging the cut blank of wire which forms the hose clamp.

In forming hose clamps from a die made according to our invention, a four-slide machine is preferably used to shape the wire on the core. A typical four-slide arrangement is shown in FIGS. 23 through 27 wherein the core die indicated in its entirety as at CD is fixed with the frame of the four-slide machine. A cut wire blank, such as 70 in FIG. 27, is carried by the slide 71 and moved with respect to the core die CD so that the ends of the cut blank 70 are disposed as indicated at 73 and 74 in FIG. 23. Thus the core die CD and slide 71 cooperate to form a U-shaped blank having projected ends at 73 and 74. Thereafter, forming tools 75 and 76 are brought in against the U-shaped blank so as to bring the free ends into positions 73a and 74a. In this way the wire blank is arranged in a spiral path around the core die CD. Thereafter, a tool 77 is moved toward the core die CD so that the arm-forming portions of the wire are pressed downwardly and are pressed against the surfaces 52 and 54 of the core die. At the same time, the free ends of the cut blank are turned upwardly to form ears 74b and 73b. The ear portions 73b and 74b are adapted to be gripped by hose clamp pliers and thus expand the hose clamp and effect its mounting on the hose. It will be noted from FIG. 27 that the grove 71a has a helix form which facilitates the spiraling of the hose clamp wire as it is moved against the core die CD.

Figure 24:
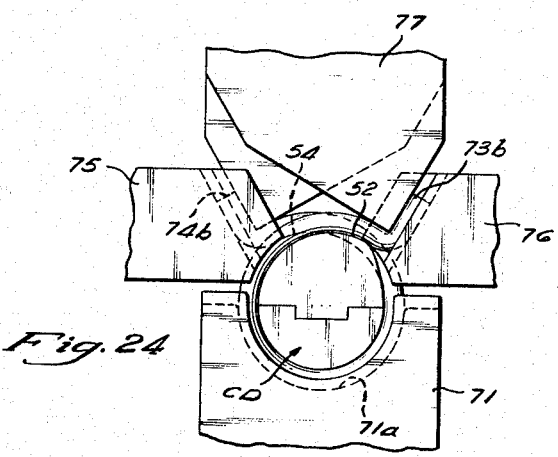
FIG. 24 is a view similar to FIG. 23 showing the position of the forming tools at the conclusion of the clamp-forming operation.
Figure 26:
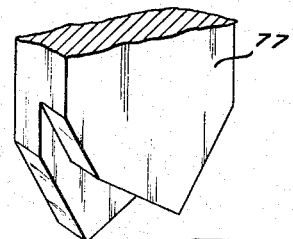
FIG. 26 is a perspective view of the ear-forming slide tool shown in FIG. 24.

In setting up the tools in the four-slide machine the advance of the tools toward the core die should be as illustrated in FIG. 24 so that the wire forming the hose clamp is pressed against the core die by the tools 71, 75 and 76. The tool 77 is preferably adjusted as illustrated in FIG. 24 so that the arm-forming portions of the clamp are not coined against the entire surface of the arm-forming portions of the core die. This relief is obtained by adjusting the tool 77 so as to insure that when the clamp is released from the die there will be the small included angle between the arms of the clamp and the horizontal plane through the cross-over point in the clamp.

Although we have shown and described our invention in considerable detail, it will be appreciated by those skilled in the art that numerous modifications may be made therein without departing from the scope of the invention as defined in the following claims.

What is claimed is:

1. A core die for making hose clamps consisting of a lower semi-elliptical core section and an upper semi-elliptical core section, said upper core section having axially spaced arm-forming die surfaces at opposite sides of a central vertical plane through the upper and lower core die sections, said upper and lower core die sections having cooperating means to hold the upper and lower core die sections to each other, said upper and lower sections being secured to each other on a horizontal plane normal to said vertical plane, said lower core die section being formed to provide two blending circular arcs which have their centers in said horizontal plane and at opposite sides of the said vertical plane.

2. A core die for making hose clamps comprising a lower semi-elliptical core section and an upper semi-elliptical core section, said upper core section having a vertical extent exceeding the vertical extent of the lower core section and having arm-forming die surfaces for the hose clamp at opposite sides of a vertical plane through the upper and lower core sections, said upper and lower sections having cooperating means to hold the upper and lower sections to each other, said upper and lower sections being secured to each other on a horizontal plane, said lower section being formed along two blending arcs which have their centers in said horizontal plane and at opposite sides of the said vertical plane.

3. A core die for making hose clamps consisting of a lower semi-elliptical core section having an integrally formed supporting shank and a removable upper semi-elliptical core section, said upper core section having arm-forming die surfaces at opposite sides of a central vertical plane through the upper and lower core sections, said upper and lower core sections having cooperating fastener means arranged to hold the upper core section in operative position on said lower section and shank, said upper and lower core sections being secured to each other on a plane normal to said vertical central plane, said upper and lower core sections being formed on arcs which have their centers in said plane normal to said vertical plane and at opposite sides of the said vertical plane.

4. A core die for hose clamps consisting of two parts, said first part comprising a mounting shank, a key flange and a semi-elliptical lower core section integrally formed with said shank and key flange, the other part of said core die comprising a separate semi-elliptical core section mounted on and secured to said lower core section on a horizontal plane, said upper and lower core sections having arcuate clamp-forming surfaces having their centers located in the said horizontal plane.

5. A core die for hose clamps consisting of two parts, said first part comprising a cylindrical mounting shank, an integrally formed key flange having spaced keyways, and an integrally formed semi-elliptical lower core section, the other part of said core die comprising a separate detachable semi-elliptical core section adapted to be mounted on and secured to said lower core section, said upper and lower core sections having arcuate clamp-forming surfaces, said clamp-forming surfaces having their centers located in the plane of the parting line between the upper and lower sections and at opposite sides of a vertical plane normal to the parting line plane.

6. A core die for hose clamps consisting of two parts, said first part comprising a mounting shank extending rearwardly from the core die, a key flange having spaced vertical key surfaces and a semi-elliptical lower core section integrally formed with said shank and key flange and extending forwardly of the key flange, the other part of said core die comprising a separate semi-elliptical core section mounted on said lower core section along a horizontal plane, said upper and lower core sections having arcuate clamp-forming surfaces having their centers located in the said horizontal plane, said upper and lower core sections having interlocking fastening means to prevent displacement of one section relative to the other section.

7. A core die for forming hose clamps comprising upper and lower semi-elliptical sections connected to each other along a horizontal plane, said lower semi-elliptical section having an arcuate portion in each quadrant at the opposite sides of a vertical plane through the core die, said arcuate portions each being formed on a radius having its center in said horizontal plane at that side of the vertical plane remote from said last-named arcuate portion, said upper core die section having arcuate forming surfaces in each quadrant thereof at opposite sides of said vertical plane, said last-named arcuate forming surfaces having their radii centers on said horizontal plane at that side of the vertical plane remote from the last-named arcuate forming surface, the length of the said radii for the forming surfaces for the upper core die section being greater than the length of the radii for forming the lower core die section.

8. A core die for forming hose clamps comprising upper and lower semi-elliptical sections connected to each other along a horizontal plane, said lower semi-elliptical section having an arcuate portion in each quadrant at the opposite sides of a vertical axis normal to the said horizontal plane, said arcuate portions of the lower section being formed on a radius having its center in said horizontal plane at that side of the vertical axis remote from the arcuate portion, said upper core die section having arcuate portions in each quadrant thereof at opposite sides of said vertical axis, said last-named arcuate portions also having their centers in said horizontal plane at that side of the vertical axis remote from the forming surface, the radii of the arcuate surfaces for the upper core die section exceeding the length of the radii for the lower core die arcuate surfaces, and said upper core die section having arm-forming surfaces in each quadrant above the centers on the same side of said vertical axis.

9. A core die for forming hose clamps comprising upper and lower semi-elliptical sections connected to each other along a horizontal plane which is nearer to the bottom of the core die than to the top thereof, said upper and lower semi-elliptical sections having an arcuate portion in each quadrant of the core die, said arcuate portions all being formed on radii having their centers in said horizontal plane, each of said arcuate portions having its center at that side of the vertical axis remote from the respective arcuate portion, the length of the radii of the arcuate forming portions for the upper core die section exceeding the length of the radii for forming the lower core die forming portions, and clamp arm-forming surfaces in each quadrant of the upper die section, the clamp arm-forming surface in one quadrant being formed on the same radius as the arcuate forming portion in the other quadrant.

References Cited by the Examiner

UNITED STATES PATENTS

| | | | |
|---|---|---|---|
| 2,206,797 | 7/40 | Williams | 76—107 |
| 2,324,143 | 7/43 | Erdman | 76—107 |
| 2,977,999 | 4/61 | Kavinski | 140—88 |
| 3,113,597 | 12/63 | Meese et al. | 140—88 |

FOREIGN PATENTS 958,288   2/57   Germany.

CHARLES W. LANHAM, *Primary Examiner.*

MICHAEL V. BRINDISI, *Examiner.*